April 22, 1941.  A. E. LUDWIG  2,239,172
BRAKE
Filed April 11, 1940   3 Sheets-Sheet 1

INVENTOR.
ARNOLD E. LUDWIG.
BY Joshua R.H. Potts
ATTORNEY.

April 22, 1941.　　　　A. E. LUDWIG　　　　2,239,172
BRAKE
Filed April 11, 1940　　　3 Sheets-Sheet 3

INVENTOR.
ARNOLD E. LUDWIG.
BY Joshua R H Potts
ATTORNEY.

Patented Apr. 22, 1941

2,239,172

UNITED STATES PATENT OFFICE 2,239,172

BRAKE

Arnold Edward Ludwig, Asbury Park, N. J.

Application April 11, 1940, Serial No. 329,158

2 Claims. (Cl. 188—79.5)

This invention deals with brakes such as are now commonly employed in the modern motor vehicle.

While the brake mechanisms employed in different makes of motor vehicles may vary, they all might be generally characterized as including a brake drum together with one or more brake shoes with either the drum or the shoes movable relative to the other. While either the drum or the shoes may carry the brake lining, the usual practice is to mount this lining on the shoes.

In all the modern automotive brakes, such as above characterized, the braking effects are obtained by urging the movable element, whether it be the shoes or the drum, against the other element so that there is an engagement of the brake lining on one element with the other.

It is evident that with continued use of the brake mechanism the brake lining wears down and, as a result, it becomes necessary to carry out the relative movement between the drum and shoes a greater and greater distance to obtain the required braking effects and after certain periods it is necessary to make adjustments to accommodate this wear.

The present invention has in view, as its primary object, the provision of a brake mechanism of the character above-noted which includes means for automatically adjusting the relative positions of the drum and shoe elements so that, upon release of the brake mechanism to a non-applied condition, the clearance between the drum and shoe elements will be a constantly predetermined factor, regardless of the condition of wear on the lining Yet another object of the invention is the provision of a brake mechanism of the character above-outlined which includes some form of casing or supporting structure, and in which the movable element carries follower means. This follower means is mounted on the casing or supporting structure by a mechanical device permitting a certain predetermined amount of movement between said follower means and the casing or supporting structure for all positions of the follower means with respect to the movable element.

More in detail this invention has in view, as a further object, the provision of brake mechanism of the type set forth in the preceding paragraph in which the follower means is movable relative to the movable element with which it is associated, and instrumentalities are provided for causing movement of the follower means relative to the said movable element coincident with and commensurate to wear of the brake lining.

A still further objective of the invention is the provision of brake mechanism of the type hereinbefore set forth in which means is provided for keeping the follower means in close juxtaposition to the movable element by which it is carried.

More in detail, this invention contemplates an arrangement in which this means is resilient and may take the form of a coiled spring which constantly urges the follower means against the movable element by which it is carried.

In accordance with the design of brakes as they appear in most of the modern automobiles, the drum is stationary and is enclosed by a pair of brake shoes which move into and out of engagement with the drum, the brake shoes carrying the brake lining.

Accordingly, a further object of the invention is the provision of a brake of the character above-noted in which the follower means is associated with the shoe element of the brake.

Still another objective of the invention is the provision of a brake of the character above-noted in which a series of ratchet teeth is carried on the shoe element and the follower means takes the form of a pawl, the end edge of which is in engagement with the said series of ratchet teeth.

This pawl is pivotally mounted on the casing or supporting structure by a pin and slot connection permitting a certain predetermined amount of movement of the pawl relative to the casing or supporting structure.

Still more in detail this invention has in view, as an object, the provision of a brake mechanism of the character above-noted in which the follower pawl is held against the brake shoe with which it is associated by a coil spring and in which movement of the pawl, relative to the shoe, is caused by another coil spring.

A more particular object of the invention is the provision of a brake mechanism in which a pair of brake shoes are pivotally mounted in the brake casing and a follower means, such as contemplated by this invention, is associated with each of said brake shoes.

Still another more specific object of the invention is the provision of a brake mechanism including a pair of brake shoes, one of which is pivotally mounted at one end on the brake casing with the other shoe secured to said first mentioned shoe by a floating bar connection.

The invention has particularly in mind the provision of a follower means for each of said shoes, and still more in detail, the invention has particularly in mind an arrangement in which the follower means are disposed substantially diametrically opposite one another.

Yet another specific object of the invention is the provision of a brake mechanism in which one brake shoe is formed at one end with a notch which receives a pivot pin carried by the brake casing. A follower means is associated with this shoe, preferably substantially at the end remote from said notch and pin. A second shoe is connected to said first shoe by a floating bar connection and a fair of follower means are associated with said second shoe at spaced points.

Various other more detailed objects and advantages of the invention will in part become apparent and in part be hereinafter stated as the description of the invention proceeds.

The invention, therefore, comprises a brake mechanism consisting of a drum element and a shoe element with one of said elements movable with respect to the other, a brake lining carried by one of said elements and adapted to engage the other, means for moving the said movable element into engagement with the other, means for keeping said elements in a relative retracted or spaced position, and means for automatically adjusting the relative positions of said drum and shoe elements so as to maintain constant the distance therebetween in a retracted state, regardless of the condition of wear on the brake lining. This automatic means preferably takes the form of follower means which is associated with the movable element and which is mounted on the casing or supporting structure of the brake mechanism by a device providing for a certain predetermined amount of movement of the follower means relative to the casing or supporting structure.

Provision is made for keeping the follower means in close juxtaposition to the movable element with which it is associated, such as by a coil spring, and provision is also made for moving the follower means relative to the movable element with which it is associated coincident to and commensurate with wear on the brake lining, and this means also may take the form of a coil spring.

The follower means preferably takes the form of a pawl pivotally mounted on the casing or supporting structure by a pin and slot connection and which has an end edge engaging a series of ratchet teeth on a shoe element. Particular details of the invention reside in the arrangements of the follower means with the shoe assemblies of the particular braking mechanisms.

For a full and more complete understanding of the invention, reference may be had to the following description and accompanying drawings where:

Figure 2 is a view somewhat similar to Figure 1 of one-half of the brake depicting the relation of the parts in brake applied position, while Figure 3 is a similar view showing the relation of the parts in a brake released position.

Figure 1:
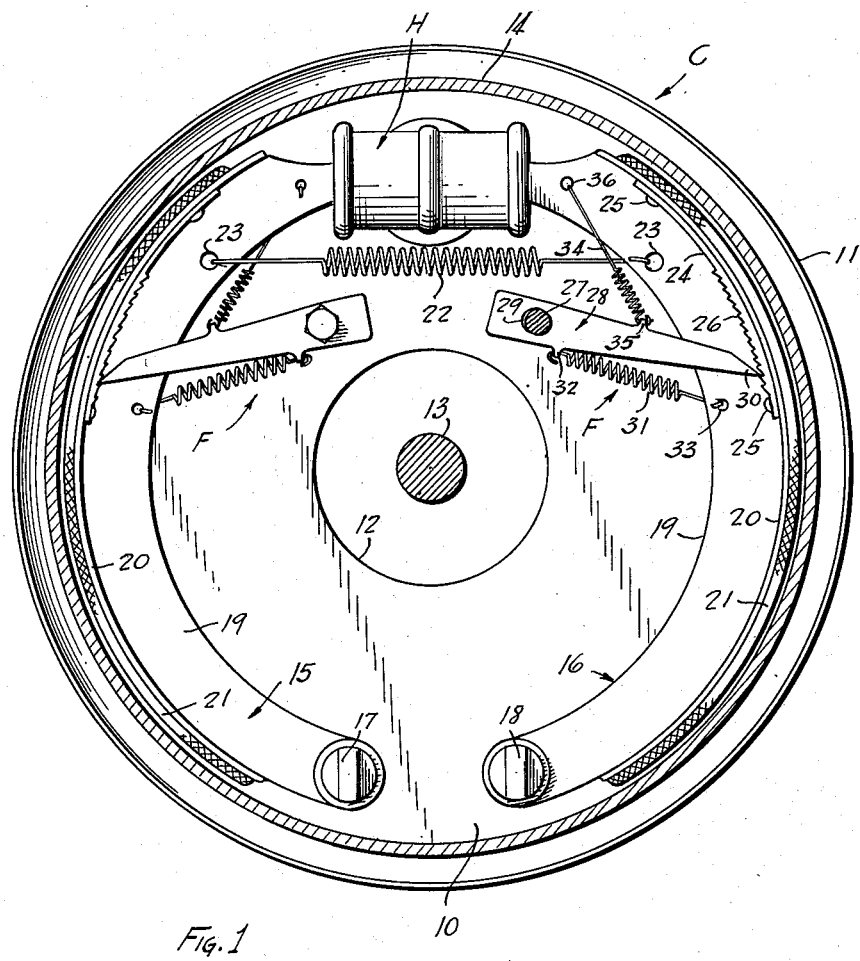
Figure 1 is a side view partly in section and partly in elevation of a brake mechanism made in accordance with this invention. This view is taken as a section on a plane normal to the axis of the circular brake.

Referring now to the drawings, wherein like reference characters denote corresponding parts, the automatic adjusting means of this invention is shown in Figure 1 as applied to a brake comprising a casing referred to in its entirety by the reference character C and which casing includes a flat wall 10 which carries a cylindrical housing 11 that encloses the brake mechanism. The wall 10 may be formed with the usual central circular opening 12 through which passes the automotive axle 13. Carried by the casing C within the cylindrical wall 11 is a drum 14 and it is the inner face of this drum which provides a braking surface.

A pair of brake shoes 15 and 16 are pivotally carried on the wall 10, the pivotal mountings being shown at 17 and 18, respectively. Inasmuch as brake shoes 15 and 16 are substantially of duplicate construction, only one of them needs here be described in detail for the purposes of this specification. According, it is noted that each of the brake shoes 15 and 16 comprises a main rib or web 19 which carries an arcuate flange 20. Carried on the outer face of the flange 20 is a brake lining 21 which is secured thereto in a manner well-known in the brake art. This lining 21 may take the form of any fabric lining now meeting with approval in this field.

Carried by the wall 10 substantially opposite to the pivotal mountings 17 and 18 is a hydraulic cylinder assembly H which is connected with the hydraulic brake system of a motor vehicle in a well-known manner. The free end of each of the shoes 15 and 16 is connected to movable pistons (not illustrated) which are a part of the hydraulic cylinder assembly H. A tension coil spring is shown at 22 and has each end anchored to the shoes 15 and 16 respectively, the anchorages being indicated at 23. This spring normally serves to maintain the shoes 15 and 16 in a retracted or released position. However, the force of the spring 22 may be overcome by the hydraulic cylinder assembly H to spread the shoes and cause the lining 21 to engage the drum 14 in a well-known manner.

Figure 4:
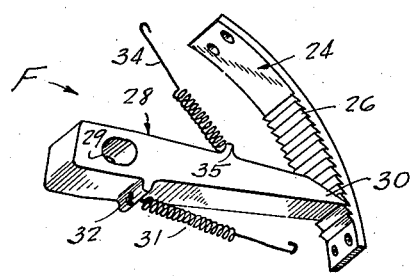
Figure 4 is a detailed view in perspective of the follower means per se.

Considering now more particularly Figure 4, together with the disclosure of Figure 1, it is noted that a rack bar 24 is mounted on the inner face of the flange 20 in any preferred manner, such as by the fastening elements depicted at 25. This rack bar 24 is formed with a series of ratchet teeth 26. A pin 27 is carried by the casing wall 10 and extends inwardly therefrom. Pivotally mounted on this pin 27 is a pawl 28, the latter being formed with a slot 29 which receives the pin 27. It is notable that the opening 29 is a slot as compared to a circular opening; thus, there is a certain amount of movement that is possible between the pawl 28 and the pin 27. This pawl 28 is formed with an end edge at 30 which engages the ratchet teeth 26 and which is adapted to ride thereover in one direction, in accordance with the principles of pawl and ratchet mechanisms.

A coil spring shown at 31 has one end anchored to the pawl 28, as depicted at 32, and its other end is anchored to the rib 19, as illustrated at 33. This spring 31 is a tension spring and is effective to constantly urge the pawl 28 against the ratchet teeth 26 of the rack bar 24. A second coil spring 34 has one end anchored to the pawl 28 as shown at 35, and its other end secured to the web 19, as shown at 36.

It is notable that this coil spring 34 is also a tension spring and of less strength than the spring 31. The tendency of this spring is to cause the end edge 30 to ride over the ratchet teeth 26 when the flange 20 has been moved out a sufficient distance to permit of such movement.

For the purposes of this application, the adjuster device, made up by pawl 28, rack bar 24, springs 31 or 34, and pin 27, is referred to in its entirety by the reference character F.

Figures 2, 3:
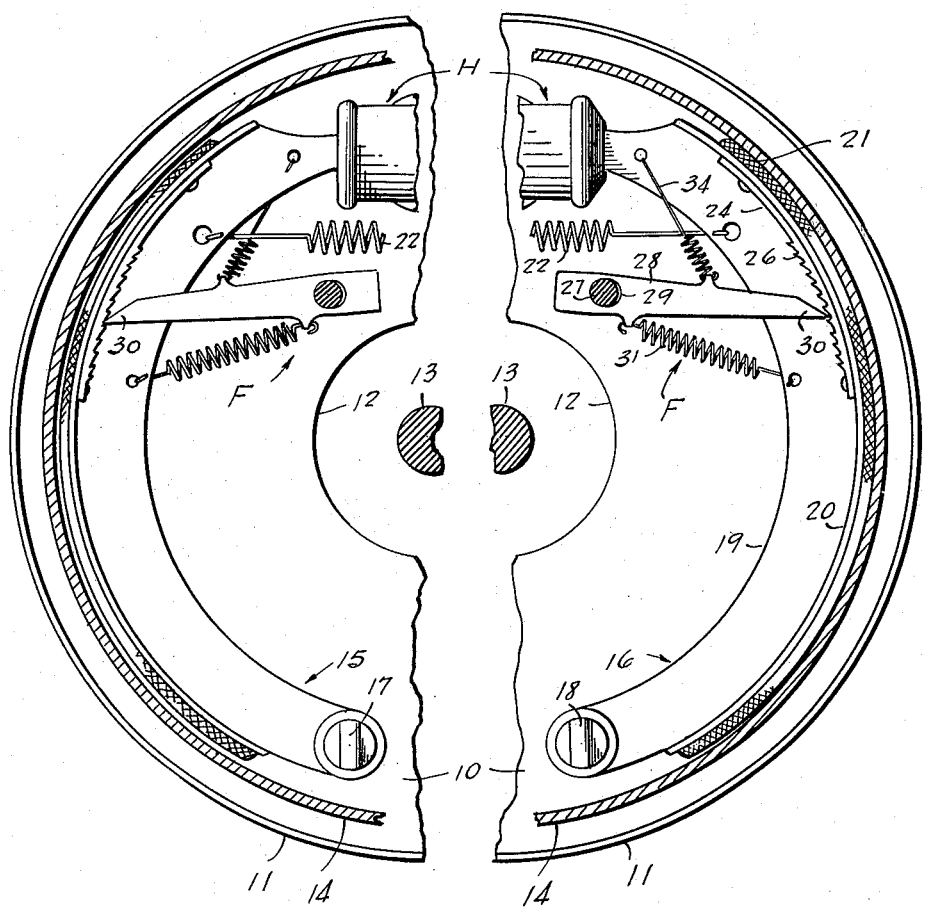

Referring now more particularly to Figure 2, it is notable that the lining 21 is therein depicted as being substantially in engagement with the drum 14. When the shoe carrying this lining is applied it moves out toward the drum 14 so that the lining engages the inner face of the latter. As the shoe moves outwardly the spring 31 causes the pawl 28 to move with the shoe. At the same time this outward movement of the pawl 28 is limited by engagement of the pin 27 with one end of the slot 29, this being clearly brought out in Figure 2. The spring 34 will now be effective to cause the end edge 30 of the pawl 28 to ride over the ratchet teeth 26 as far as will be permitted by the relative outward movement of the shoe. When the brake is released the spring 22 causes the shoes 15 and 16 to move relative to each other into a retracted position, but the amount of movement permitted in this direction is exactly limited by the relative movement of the pin 27 and slot 29. Thus, the shoe can only retract as far as is permitted by movement of the pin 27 from one end of the slot 29 to the other.

Figure 3 shows the lining 21 as being spaced from the drum an appreciable distance. In this view the shoe is shown in a retracted state and ready for application. When the brake is applied the shoe will move outwardly and the end edge 30 of the pawl 28 will move upwardly one or more notches, as the lining 21 wears down.

Figure 5:
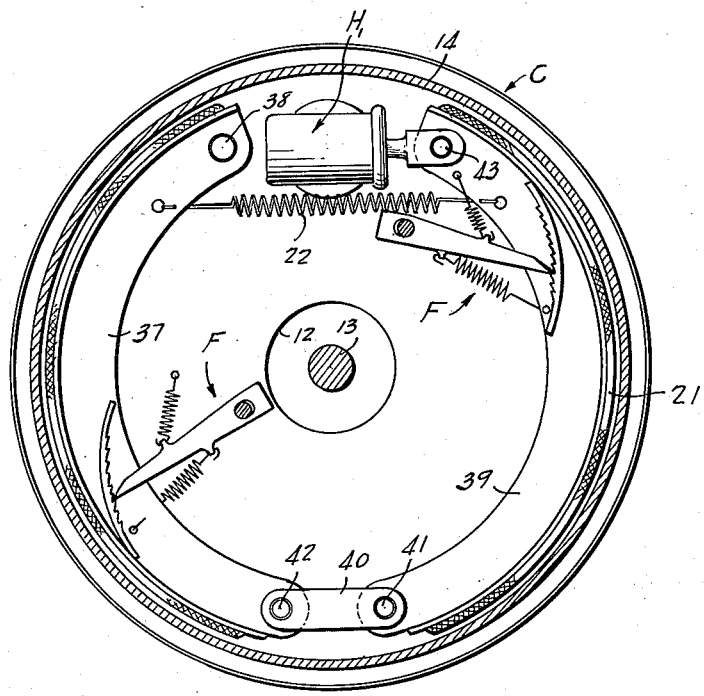
Figure 5 is a showing somewhat similar to Figure 1, of one modification.

Referring now more particularly to Figure 5, the adjuster device of this invention is shown as applied to a brake mechanism having a slightly different shoe assembly from that depicted in Figure 1. In this form of the invention the casing C maintains substantially the same construction previously described, as does the drum 14. However, one brake shoe 37 is shown as being pivotally mounted at 38. A second brake shoe 39 is pivotally attached at one end to a floating bar 40, the pivotal connection being shown at 41. This bar 40 is in turn pivotally connected to the shoe 37, as shown at 42. The hydraulic cylinder assembly H₁ is connected only to the free edge of brake 39, as shown at 43. A tension coil spring 22 is stretched between the shoes 37 and 39 just as in the form of the invention shown in Figure 1.

In this form of the invention an adjuster device F is associated with the shoe 39 in the vicinity of the connection 43 and a second adjuster device F is associated with the shoe 37 substantially diametrically opposite to the first-mentioned adjuster device. These follower means function in the manner hereinbefore described.

Figure 6:
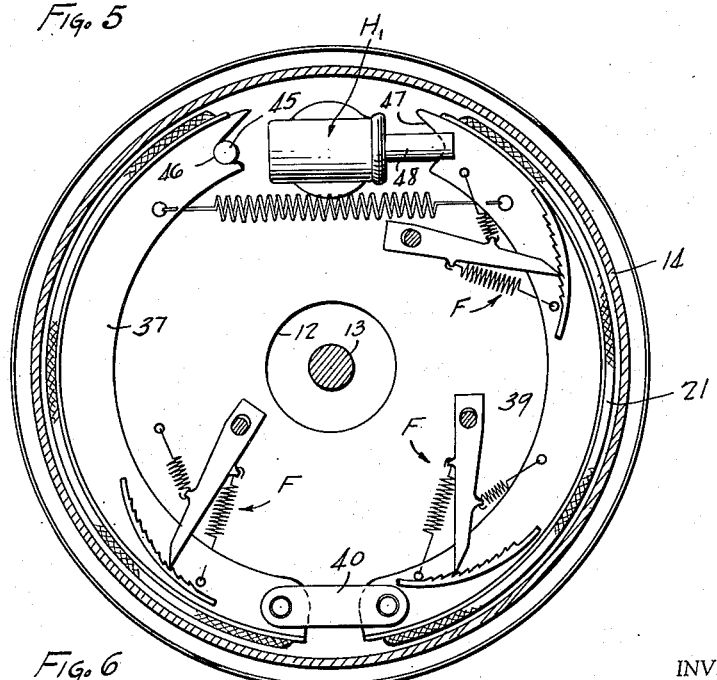
Figure 6 is another view of Figures 1 and 5 of still another modification.

Referring now more particularly to Figure 6, still another modification of the brake mechanism is therein shown. This form of the invention is substantially the same as that brought out in Figure 5, with the exception of the pivotal mounting 38 being replaced by pivot pin 45 which is received in a notch 46. The end of the shoe 39 which is connected to the hydraulic assembly H₁ is also formed with a notch, as shown at 47, that receives the pin on the extremity of a piston 48.

In this form of the invention there is an adjuster device F associated with the shoe 37 as described in connection with Figure 5 and there is also an adjuster device F associated with the shoe 39 in the vicinity of the free end thereof. However, there is still another adjuster device F associated with this shoe 39 adjacent its connection with the floating bar 40.

While preferred specific embodiments of the invention are hereinbefore set forth, it is to be clearly understood that the invention is not to be limited to the exact constructions illustrated and described, because various modifications of these details may be provided in putting the invention into practice, within the purview of the appended claims.

I claim:

1. In a brake of the character described including a casing, a drum carried by the casing, a shoe pivotally mounted on said casing and movable with respect to said drum, and a brake lining on said shoe, the improvement which comprises a series of ratchet teeth carried by said shoe and having stop shoulders and longer inclined faces, a pawl having an end edge in engagement with said ratchet teeth, a pin and slot connection pivotally mounting said pawl on said casing, and spring means engaging said pawl and exerting a tendency to keep said end edge of said pawl in engagement with said ratchet teeth and cause said edge of the pawl to slide upwardly on one longer inclined face of one tooth and engage another stop shoulder when wear of said brake lining requires adjustment of said shoe.

2. In a brake of the character described including a casing, a drum carried by the casing, a shoe pivotally mounted on said casing and movable with respect to said drum, and a brake lining on said shoe, the improvement which comprises a series of ratchet teeth on said shoe, each tooth of said ratchet teeth having a stop shoulder and a longer inclined surface, a pawl mounted on said casing and having an end edge in engagement with said ratchet teeth, said edge having a square shoulder adapted to engage the stop shoulder of any of said ratchet teeth and a longer inclined surface adapted to engage any inclined surface of said ratchet teeth, a spring urging said end edge of said pawl into engagement with said series of ratchet teeth, and a second spring exerting a force to cause said inclined surface of said edge of said pawl to slide upwardly on said longer inclined surface of one of said teeth and engage another stop shoulder when wear of said brake lining requires adjustment of said shoe.

ARNOLD EDWARD LUDWIG.